Dec. 13, 1949     H. M. BRYANT ET AL     2,490,777
INDICATOR SYSTEM
Filed May 22, 1945     2 Sheets—Sheet 1
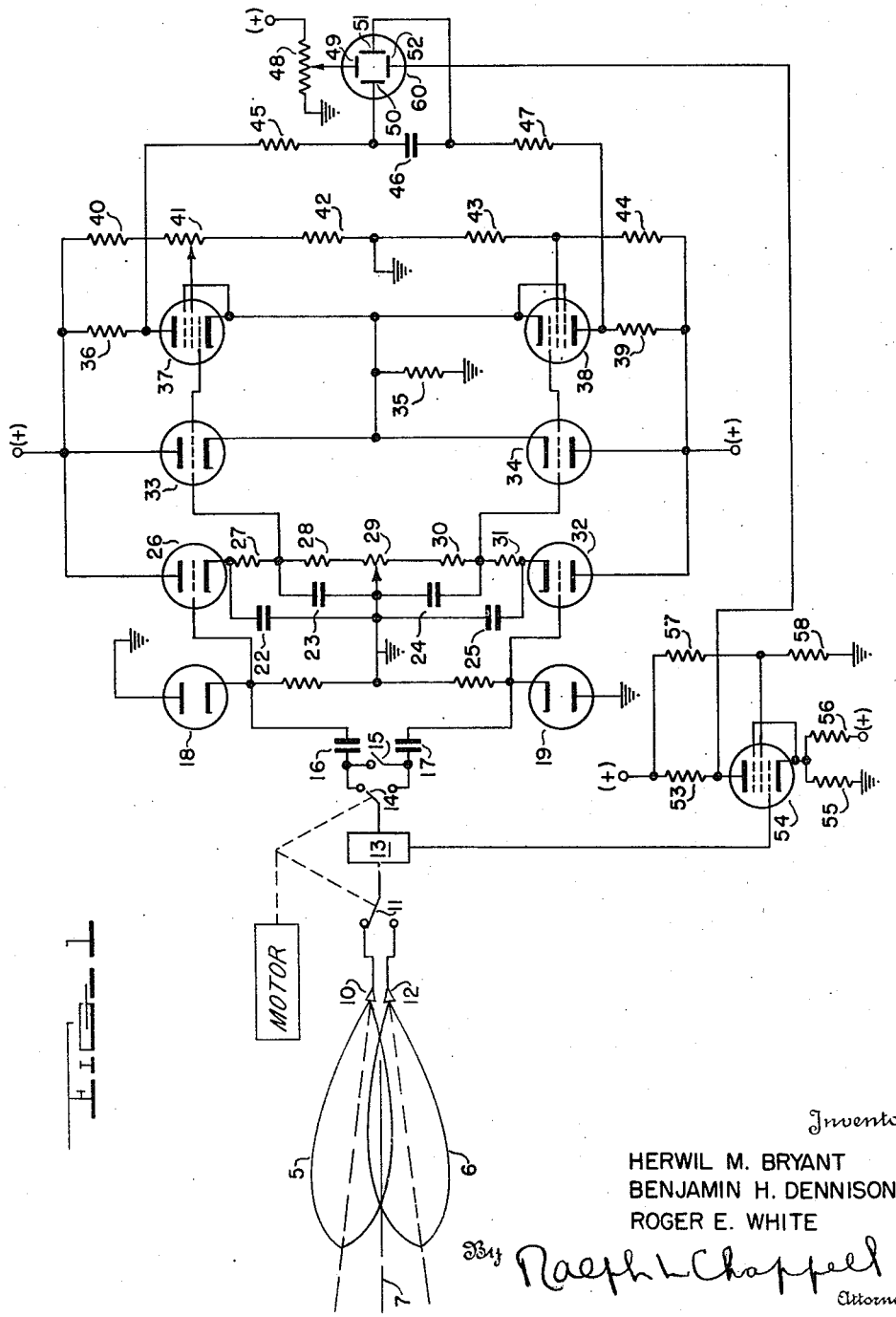
Inventors
HERWIL M. BRYANT
BENJAMIN H. DENNISON
ROGER E. WHITE
By Ralph L. Chappell
Attorney Dec. 13, 1949
H. M. BRYANT ET AL
2,490,777
INDICATOR SYSTEM
Filed May 22, 1945
2 Sheets—Sheet 2
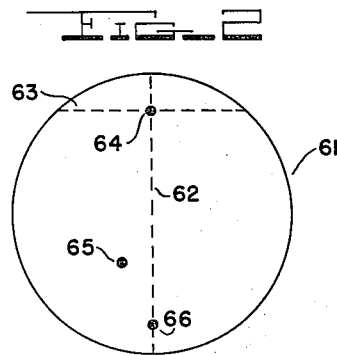
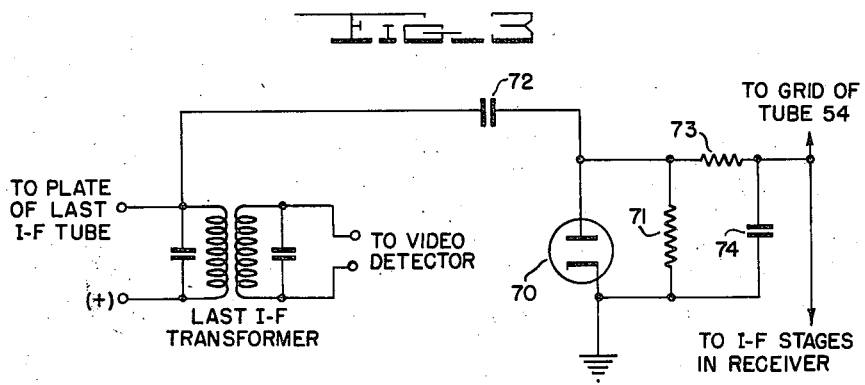
Inventors
HERWIL M. BRYANT
BENJAMIN H. DENNISON
ROGER E. WHITE
By Ralph L. Chappell
Attorney Patented Dec. 13, 1949

2,490,777

UNITED STATES PATENT OFFICE 2,490,777

INDICATOR SYSTEM

Herwil M. Bryant, Washington, D. C., Benjamin H. Dennison, Alexandria, Va., and Roger E. White, United States Navy Application May 22, 1945, Serial No. 595,223

7 Claims. (Cl. 343—120)

(Granted under the act of March 3, 1883, as amended April 30, 1928; 370 O. G. 757)

This invention relates in general to a radio direction indicator, and in particular to a radio aircraft homing indicator.

An object of this invention is to provide a homing or direction finding indicator which provides an indication of both the bearing and the proximity of the indicator system relative to the signal source.

Another object of this invention is to provide a homing or direction finding indicator which employs the automatic volume control signal of an ordinary radio receiver for indicating the proximity of the system to the signal source.

Another object of this invention is to provide a homing or radio direction finding indicator of the foregoing type, which employs a cathode ray tube, the horizontal beam movements of which are used to indicate bearing and the vertical beam movements of which are used to indicate distance.

Objects and features of the present invention will become apparent upon a careful consideration of the following detailed description when taken together with the accompanying drawings.

Fig. 1 is a diagram, partly in block, of a typical embodiment of the invention,

Fig. 2 is a face view of a cathode ray tube illustrating several typical indications of bearing and proximity obtainable by the system of Fig. 1; and Fig. 3 is a circuit diagram illustrative of the manner in which an automatic-volume-control signal obtained from an ordinary radio receiver may be employed to provide distance indication in the present invention.

As hereinafter described in detail, the homing or direction finding system of the invention as disclosed in Fig. 1 is provided with a pair of directional antennas 10 and 12 which are arranged so that their major field intensity patterns 5 and 6 slightly overlap to provide a heart-shaped field intensity pattern for the two antennas in combination. With this arrangement of the antennas 10 and 12 only one orientation thereof relative to a remote signal source will result in the reception of equal intensity signals by both antennas. Namely, that orientation which occurs when the axis 7 of their overlapping patterns is directly in line with the remote signal source. Other orientations of the antennas will result in one antenna receiving a stronger signal than the other. The output of each antenna 10 and 12 is alternately applied through a suitable antenna switching device 11 to a single receiving means indicated in general at 13. The output from the latter is in turn alternately applied through a second switching device 14, synchronously driven, by motor 4, for example, with the first switching device 11, to the left and right horizontal deflecting plates 50 and 51 of the cathode ray tube 60. The two switching means 11 and 14 are thus cooperating in such a manner that the signals applied to the receiving system 13 by antenna 10 are always fed to the left hand horizontal deflection plate 50 of the cathode ray tube 60. Similarly, the signals applied to the receiving means 13 by antenna 12 are always fed to the right hand horizontal deflection plate 51 of the cathode ray tube 60. In this manner any inequality in the intensity of the signals being received by the antennas 10 and 12 will result in a horizontal movement of the cathode ray tube beam in a direction governed by which antenna receives the stronger signal.

Also, as will be described hereinafter in detail, the automatic volume control signal whose magnitude is dependent upon the average intensity of the signals reaching antennas 10 and 12 and obtained from the receiving system 13 is applied through an amplifier 54 to the vertical deflecting plate 52 of the cathode ray tube 60. Then, as the automatic volume control signal increases or decreases according to the average signal intensity reaching the antennas 10 and 12, the cathode ray tube beams will be caused to move vertically to indicate the distance of the indicator system relative to the signal source.

In the preferred case where the system of the invention is used for purposes of aircraft homing the two antennas 10 and 12 are preferably of the Yagi type, mounted respectively on the starboard and port wings, for example, of the airplane as described in the patent application of H. Senf et al., Serial No. 468,106, filed December 7, 1942. The antennas are then so orientated that the axis 7 of the overlapping portions of their field intensity patterns will be in line with the center line of the plane. Thus when the heading of the plane is in a direct line with the source on which the plane is homing, signals of equal intensity will be received by each antenna. Right and left deviations of the flight path of the plane from this course will result respectively in left and right movements of the cathode ray tube beam. The receiver 13 may be of any conventional type, for example, a superheterodyne, if a continuous wave or single modulated signal source is being homed-on. If, however, a pulse source is being homed-on, the receiver should be adapted to pulse work. In either event the receiver is to be equipped with an automatic volume control circuit of a type similar to that hereinafter described, which is arranged to provide a reliable automatic volume control signal the magnitude of which is dependent upon the average intensity of the signals reaching the antennas 10 and 12. The two switching devices 11 and 14 may be, if desired, of the type described in the aforementioned patent application, synchronously driven at a rate, for instance, of 30 to 40 cycles per second.

In operation switch 11 alternately changes the input to the receiver 13 from antenna 10 to antenna 12, while at the same time switch 14 alternately applies the output of the receiver across diodes 18 and 19 to the control grids of two peak signal detectors 26 and 32. The diodes 18 and 19 have their cathodes connected to the grids of the peak signal detectors 26 and 32 and their plates connected to ground to prevent the grids of the peak signal detectors from dropping below ground potential. As the input signal to the receiver 13 is changed from antenna 10 to antenna 12 and its output from detector 26 to 32, pulses of current are caused to flow through each of the peak signal detectors. To filter these pulses of current so as to provide a smooth voltage output from each detector, the ratio of which is equal approximately to the ratio of the signal intensity received by each of the respective antennas 10 and 12, a long time constant circuit is inserted between the cathode of each detector and its corresponding output load resistance. In the circuit of detector 26 this time constant comprises capacitances 22 and 23 and resistance 27. In detector 32 this time constant circuit comprises capacitances 24 and 25 and resistance 31. In each detector the time constant of the circuit is made large compared to the time required for the switches 11 and 14 to complete a cycle of operation so that the output from each of the detectors as taken from across the output load resistance 28 for the first detector 26 and from across the output load resistance 30 for the second detector 32 will not vary during any given switching cycle.

The output of the detector 26 is applied in parallel to the grid of a bias adjusting cathode follower 33 and the control grid of a deflection amplifier 37 while the output of the detector 32 is applied in parallel to the grid of a second bias adjusting cathode follower 34 and the control grid of a second deflection amplifier 38. The cathodes of tubes 33, 34, 37, 38 are connected together and returned to ground through a compensating biasing resistor 35 whose function is to vary the cathode potential of the deflection amplifiers 37 and 38 in such a manner as to apply bias voltage changes of opposite polarity between the control grid of tube 37 and its cathode and between the control grid of tube 38 and its cathode. It further serves the function of increasing the bias on tubes 37 and 38 in response to an increase in the average input signal and of decreasing it in response to a decrease in the average signal, to thus maintain a potential difference between the plates of tubes 37 and 38, which is a true proportion of the difference in antenna input signals regardless of the absolute magnitude of either signal.

To illustrate the corrective action of the biasing resistance 35 consider the condition in which the grid of tube 33 is for example 5 volts positive with respect to ground and the grid of 34 is 10 volts positive with respect to ground as would be a typical case when the signal to antenna 12 is stronger than that to antenna 10. Action similar to that of a cathode follower results with the potential across resistance 35 automatically adjusting itself to a level which equals the average of the input signals, or 7½ volts, plus the normal bias voltage maintained by tubes 33, 34, 37, 38. Thus the differences in input signal voltages is divided equally between the amplifiers 37—38.

As the indicator system approaches the signal source due to relative movement between the signal source and the indicator then the input signal strength will increase. Since the automatic volume control action of the receiver cannot totally compensate for this change in input signal strength, the voltages at the grids of 33 and 34 will rise. In an extreme case, for example, the output voltages of detectors 26 and 32 may rise to approximately 80 and 90 volts, respectively. This will cause the cathodes to rise to approximately the average of 85 volts plus the normal bias voltage maintained by tube 33, 34, 37 and 38. Again the differences in input signal voltages are divided equally between the amplifiers 37 and 38.

In this illustration the deflection of the electron beam would then be to the left toward the deflecting plate 50 indicating that the signal source is to the left of the antenna center axis. In the event that the voltage applied to tube 33 exceeds that applied to 34 the deflection of the beam would be to the right toward the deflecting plate 51 indicating that the signal being received by antenna 10 is greater than that received by antenna 12.

To prevent the left and right movements of the cathode ray tube beam from being jittery and following sudden changes in the output signal from the receiver, the circuit employed to couple the output from tubes 37 and 38 to the horizontal deflection plates of the cathode ray tube comprises resistances 45 and 47 and a capacitance 46 characterized with a long time constant. For example, in a typical case it has been found desirable to make this time constant as large as two to two and one-half seconds.

To maintain a true left-right bearing indication, it is, of course necessary that the electron beam of the cathode ray tube be accurately centered under both a zero signal condition and the condition where large signals of equal strength impinge upon the antennas 10 and 12. For this purpose a vertical reference line, as hereinafter described, may be etched on the face of the cathode ray tube. A potentiometer 29 inserted in common with the cathodes of detectors 26 and 32 is arranged to equalize the potentials at the outputs of the detectors under zero signal conditions thereby compensating for any unbalance in the resistances 27, 28, 30, 31 and the tubes 26, 32.

A second potentiometer 41 arranged to control the potential on the screen of tube 37 is then adjusted to make the gain of the amplifiers 37, 38 equal for the particular signal level being employed. To make this adjustment the shorting switch 15 is closed momentarily placing signals of equal amplitude on the grids of 26 and 32. Under this condition then, potentiometer 41 is adjusted to center the spot on the vertical reference line of the cathode ray tube. Usually this centering adjustment is necessary as the average signal intensity changes. This is due to the fact that the tubes and in particular tubes 37, 38 cannot be made identical in characteristics over their entire range of operation.

Another feature of this invention is that of providing a distance or proximity indication of the indicator relative to the signal source. This distance indicator is not a true distance meter but rather a signal strength meter, the basis of operation being that the received signal will be strong when the distance to the signal source is small and weak when the signal source is far away. To provide an indication of the signal strength a signal is obtained from the automatic volume control circuit existing in the receiver and is applied through an ordinary direct coupled amplifier 54 to the lower vertical deflection plate 52 of the cathode ray tube 60. When a strong signal is being received the automatic volume control voltage will be highly negative with the result that the plate voltage of tube 54 will rise positive and the cathode ray tube beam will move vertically downward. A zero setting of the vertical position of the cathode ray tube beam is made possible by way of potentiometer 48 connected to the upper vertical deflecting plate 49. By means of potentiometer 48 the cathode ray tube beam can be adjusted so that in a zero signal condition it will be superimposed on a horizontal reference line etched on the face of the cathode ray tube and taken to indicate a zero signal condition.

A fair degree of accuracy in distance measurement is possible when homing upon a signal source for which field intensity charts are available. For this purpose a series of horizontal reference marks may be placed on the face of the cathode ray tube and calibrated with some suitable reference units. Then a zero signal setting of the beam on the horizontal zero signal line can be made by means of potentiometer 48. Vertical movement of the beam away from the horizontal reference line can then be interpolated from the various horizontal reference lines and in cooperation with a field intensity chart of the known transmitter can give the operator an approximate indication of his distance from the signal source.

An example of several typical indications which might be observed on the screen of the cathode ray tube 60 during a homing flight, is shown in Fig. 2. In this figure, the reference numeral 61 is taken to indicate the face of the cathod ray tube 60, shown in Fig. 1. The vertical line 62 is the above mentioned vertical reference line on which the cathode ray tube beam is to be maintained during a homing flight. Right and left movements of the beam from this line indicate respectively left and right deviations from the proper flight course. The horizontal line 63 is the above mentioned horizontal zero reference line for the cathode ray tube beam from which distance indications are available. Spot 64 for example, may be representative of the cathode ray tube beam in a condition of balance but with no signal being received at the start of the homing operation. Spot 65 is representative of the cathode ray tube beam at a point in a homing operation which is illustrative of a deviation to the right from the proper flight course. Spot 66 is representative of the cathode ray tube beam at a point near the signal source and is illustrative of a condition in which the proper flight course is being maintained.

In Fig. 3, a typical automatic volume control arrangement is shown together with the manner in which it is connected to the amplifier tube 54. Tube 70 is representative of a typical automatic volume control tube having a coupling capacitance 72 and a resistance 71 for the development of a negative control voltage and a resistance 73 and capacitance 74 integrating circuit to filter this control voltage. The time constant of the circuit comprising resistance 73 and capacitance 74 should be selected so as to provide an automatic volume control voltage equal to the average intensity of the signals received by antennas 10 and 12 and one which will not vary during any given switching cycle of switches 11 and 14.

Although we have shown and described only one certain and specific embodiment of the invention we are fully aware of the many modifications possible thereof. Therefore, this invention is not to be limited except insofar as is necessitated by the prior art and the spirit of the appended claims.

The invention described herein may be manufactured and used by or for the Government of the United States of America for governmental purposes without the payment of any royalties thereon or therefor.

What is claimed is:

1. A radio direction finding system, comprising a pair of similar directional receiving antennas arranged to provide a pair of similar, unidirectional field patterns which contain an overlapping portion, a single receiving means, a pair of signal detectors, means for alternately applying energy absorbed by said patterns to said receiving means and for synchronously switching the output of said receiving means from one signal detector to the other, and an indicating means connected to the output of said detectors and adapted to indicate the relative strength of the output signals therefrom.

2. A radio direction finding system, comprising a pair of similar directional receiving antennas arranged to provide a pair of similar, uni-directional field patterns which contain an over-lapping portion, a single receiving means, a pair of signal detectors, means for alternately applying energy absorbed by said patterns to said receiving means and for synchronously switching the output of said receiving means from one signal detector to the other, a cathode ray tube having at least a pair of horizontal beam deflecting means, and means connecting the output from each of said signal detectors to a respective one of said horizontal deflecting means.

3. A radio direction finding and proximity system, comprising a pair of similar directional receiving antennas which are oriented so that their respective uni-directional field patterns contain an over-lapping portion, a single receiving means including an automatic volume control circuit, a pair of signal detectors, means for alternately switching the input to said receiving means from one antenna to the other and for synchronously switching the output of said receiving means from one signal detector to the other, a cathode ray tube having a pair of horizontal and a pair of vertical beam deflecting means, means connecting the output from each of said signal detectors to a respective one of said horizontal deflecting means and means connecting the automatic volume control voltage obtained from said receiving means to one of said vertical deflecting means.

4. A radio direction finding and proximity system, comprising a pair of directional receiving antennas which are oriented so that their respective field patterns contain an over-lapping portion, a single receiving means including an automatic volume control circuit, a pair of signal detectors, means for alternately switching the input to said receiving means from one antenna to the other and for synchronously switching the output of said receiving means from one signal detector to the other, a cathode ray tube having a pair of horizontal and a pair of vertical beam deflecting means, differential amplifier means directly coupled to the output of said signal detectors and arranged to directly drive said horizontal deflecting means, and amplifier means directly coupled to the automatic volume control circuit in said receiving means and arranged to directly drive said vertical deflecting means.

5. A radio direction finding and proximity system, comprising a pair of directional receiving antennas which are oriented so that their respective field patterns contain an over-lapping portion, a single receiving means including an automatic volume control circuit, a pair of signal detectors, means for alternately switching the input to said receiving means from one antenna to the other and for synchronously switching the output of said receiving means from one signal detector to the other, a cathode ray tube having a pair of horizontal and a pair of vertical beam deflecting means, differential amplifier means directly coupled to the output of said signal detector, a long time constant coupling circuit connecting said differential amplifier means to said horizontal deflecting means; and amplifier means directly coupling the output from the automatic volume control circuit in said receiving means to said vertical beam deflecting means.

6. A radio direction finding system comprising a pair of similar directional receiving antennas arranged to provide a pair of similar, angularly disposed uni-directional field patterns, receiving means, a pair of detector means, means alternately applying energy absorbed by said patterns to said receiving means and synchronously applying the output of said receiving means from one of said detector means to the other of said detector means and means to indicate the relative strength of the outputs from said pair of detector means.

7. A radio direction finding and proximity system comprising a pair of similar directional receiving antennas arranged to provide a pair of similar, angularly disposed uni-directional field patterns, receiving means including automatic volume control means, a pair of detector means, means alternately applying the energy absorbed by said patterns to said receiving means and synchronously applying the output of said receiving means alternately to said pair of detector means, means to indicate the relative strength of the outputs of said pair of detector means and means responsive to the voltage output of said automatic volume control means to indicate the strength of the inputs to said receiving means.

HERWIL M. BRYANT.
BENJAMIN H. DENNISON.
ROGER E. WHITE.

REFERENCES CITED

The following references are of record in the file of this patent:

UNITED STATES PATENTS

| Number | Name | Date |
| --- | --- | --- |
| 2,169,742 | Scharlau | Aug. 15, 1939 |
| 2,192,581 | Schulz | Mar. 5, 1940 |
| 2,266,038 | Hinman | Dec. 16, 1941 |
| 2,271,550 | Hermanspann et al. | Feb. 3, 1942 |
| 2,415,566 | Rhea | Feb. 11, 1947 |

FOREIGN PATENTS

| Number | Country | Date |
| --- | --- | --- |
| 706,100 | Germany | May 17, 1941 |